Sept. 11, 1928.
R. F. KINSLEY
1,684,100
PROCESS OF MANUFACTURING RUBBER ARTICLES
Filed May 19, 1924    3 Sheets-Sheet 1
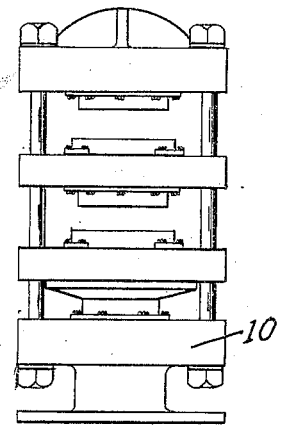
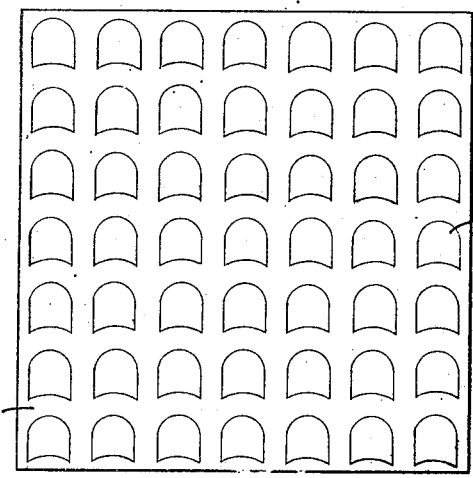
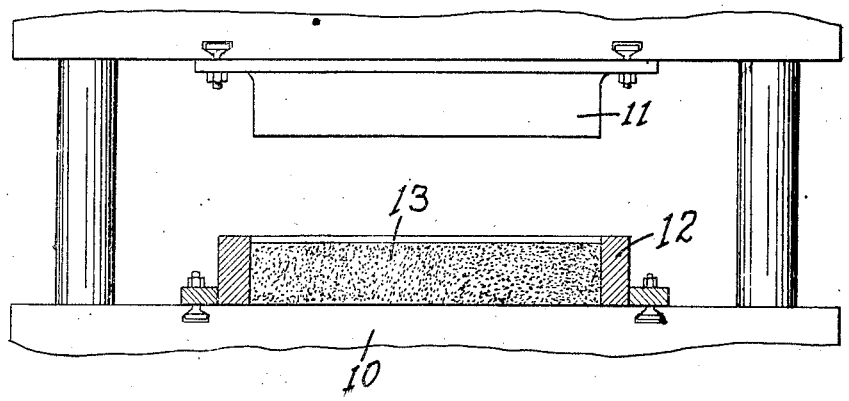
Inventor
Richard F. Kinsley
by Charles Hills
Attys.

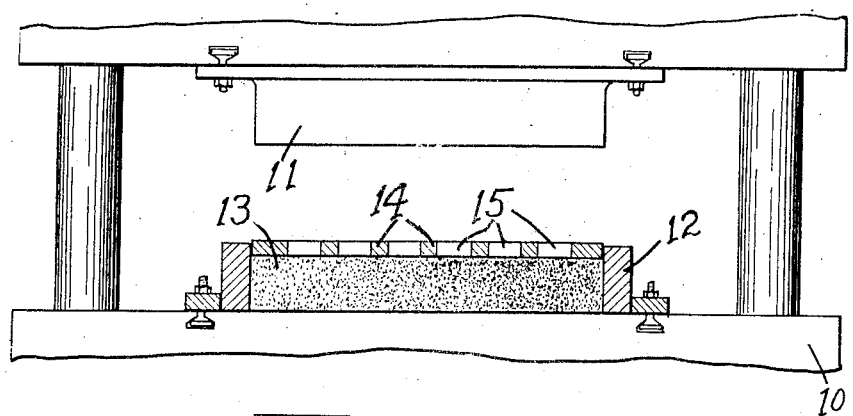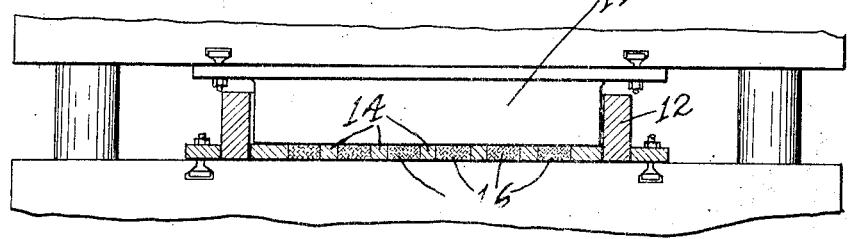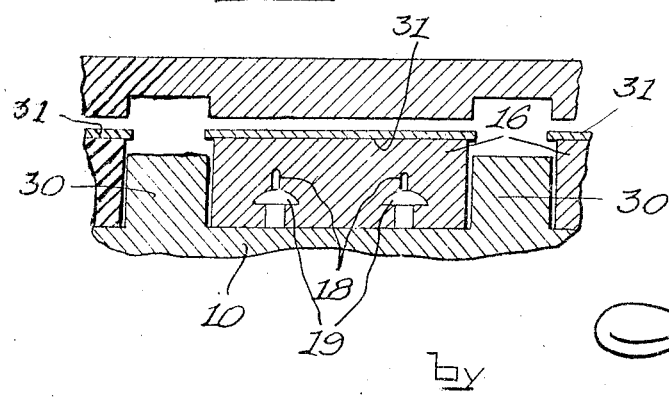

Sept. 11, 1928.
R. F. KINSLEY
1,684,100
PROCESS OF MANUFACTURING RUBBER ARTICLES
Filed May 19, 1924   3 Sheets-Sheet 3
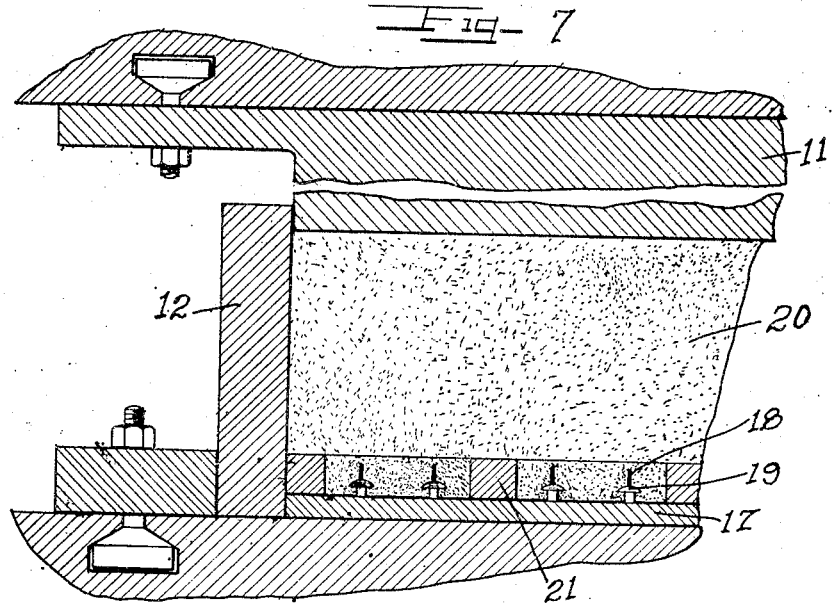
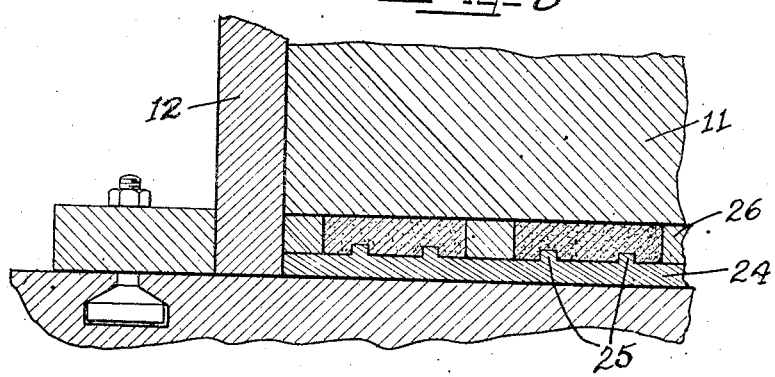
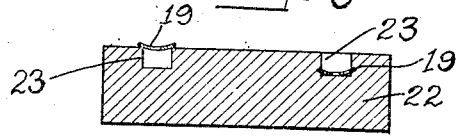
Inventor
Richard F. Kinsley
by Charles W. Hills
Attys.

Patented Sept. 11, 1928.

1,684,100

UNITED STATES PATENT OFFICE.

RICHARD F. KINSLEY, OF CHICAGO, ILLINOIS, ASSIGNOR TO DRYDEN RUBBER COMPANY, OF CHICAGO, ILLINOIS, A CORPORATION OF ILLINOIS.

PROCESS OF MANUFACTURING RUBBER ARTICLES.

Application filed May 19, 1924. Serial No. 714,195.

This invention relates to the manufacture of rubber articles, more particularly from ground waste vulcanized rubber scrap.

Rubber articles are formed with varying amounts of sulphur in their composition. Thus for example automobile inner tubes are low in sulphur and hard rubber articles very high in sulphur. Further, nearly all rubber articles contain free uncombined sulphur.

It is always possible to make rubber articles from ground waste vulcanized rubber scrap without the addition of crude rubber provided that the rubber in the article has a higher percentage of combined sulphur than the scrap. It is not always possible, however, to proceed in the opposite direction, i. e. to make articles of lower sulphur content than the scrap, without adding raw unvulcanized rubber to the mix.

One of the principal objects of this invention is to provide an improved process and means for making articles from waste vulcanized rubber scrap.

A further object of the invention is to improve the method and means for making rubber articles whether wholly from waste vulcanized scrap, wholly from raw rubber or from mixtures of the two or from reclaimed rubber.

Other and further important objects of this invention will be apparent from the disclosures in the specification and drawings.

Apparatus (in a preferred form) suitable for carrying the invention into effect is illustrated on the drawings and hereinafter more fully described.

On the drawings:—

Figure 1 shows a side elevation of a vulcanizing press suitable for carrying out the process.

Figure 2 is a vertical section through a portion of the press at the end of the first operation.

Figure 3 is a plan view of the grid used for making the blanks.

Figure 4 is a vertical section through a portion of the press showing the grid in position for making the blanks.

Figure 5 is a view similar to Figure 4 showing the end of the blank making operation.

Figure 6 is a section through the final heel making dies.

Figure 7 is a vertical section through a portion of a vulcanizing press suitable for carrying out a modified form of process.

Figure 8 is a view similar to Figure 7 illustrating a further form of process.

Figure 9 is a section through one of the blanks made by the apparatus shown in Figure 8.

As shown on the drawings:—

In all forms of process set forth the usual hydraulic vulcanizing press 10 is employed in which are arranged male and female dies 11 and 12. In the form of process shown in Figures 1 to 6 no grid or other mechanical appliance is employed in connection with the dies 11 and 12. In carrying out this process the mix, preferably consisting of finely ground waste rubber scrap without admixture with any raw rubber but usually containing added amounts of sulphur and if desired one or more filling materials or the like is inserted in the die 12. Pressure is then applied to force the die 11 down onto the material within the die 12. This pressure is only applied for a few seconds to consolidate the matter in the die 12 into a sheet 13. As the dies are heated the consolidating action of the pressure is aided by heat.

The finely ground mix may to great advantage be heated prior to insertion into the die 12 since rubber, especially in finely divided form, is a poor conductor of heat so that the transference of heat from the dies to the center of the mass is necessarily a slow operation. This pre-heating may conveniently be carried out in a rotating drum.

After consolidation into a sheet the next step is to place a grid 14 upon the sheet 13. In this grid are formed a series of apertures 15. In the form shown, which is adapted for the manufacture of rubber heels, these apertures are of substantially the same contour as the finished heels but of smaller area.

The next step is to press the grid downwards onto the layer 13 in order to force the rubber into the apertures 15, as shown in Figure 5, to form blanks 16. This operation takes about two minutes and the rubber is partly cured in the operation so far as excess sulphur in the waste and added sulphur is concerned. In other words the vulcanization has proceeded part way between the stage of vulcanization existing in the waste scrap and that of the final product.

In some cases the grid may be inserted in the die 12 before the mix is placed therein but it has been found by experience that better results are obtained by pressing the grid down onto the material than by pressing the latter down onto the grid.

The grid is then removed by sliding the die 12 laterally across its support thereby allowing the grid to drop through the bottom of the die. The blanks 16 are then detached from the grid and sent to the usual heel making moulds shown in Figure 6. This final heel forming operation takes about 15 minutes to complete.

The ground waste rubber scrap has a volume five or six times greater than that of the final heel or other article made therefrom. In the preliminary consolidation step the contraction in volume is slight but in the blank forming step the volume is reduced until it is only about 50% greater than that of the completed article.

In some cases the preliminary consolidation step may be omitted and the grid 14 laid upon the mix directly after it has been inserted in the die 12.

In Figure 7 is illustrated a method and apparatus for making blanks with washers in position therein. The dies 11 and 12 are the same as those used for the process described in connection with Figures 1 to 6. However, in the bottom of die 12 is arranged a plate 17 having a series of shouldered pins 18 thereon supporting washers 19 so that as the mix 20 is compressed it is moulded around the washers and pins. Upon this plate 17 is placed a grid 21 having apertures therein of the smaller area but greater depth than that of the completed heel.

It has been found preferable in this form of the process to place the grid beneath the mix for various reasons. First, if the grid is placed on top, at the end of the compression there is considerable lateral and upward movement of rubber from beneath the grid into the apertures in the grid which is liable to displace the washers. If the grid is placed beneath the mix the movement of rubber material is downward at all times. Second, there is always a tendency to form a fin of rubber on the side of the grid against which the mix is forced. This fin should be on the upper side of the blank to facilitate insertion of the blank into the final heel making mould. Further if the fin is on the upper side the separation of the blanks from the grid 21 and plate 17 is facilitated.

With this process the rubber mix, preferably preheated, is compressed into the apertures in the grid 21 in a single operation and the pressure is maintained until the desired degree vulcanization has taken place.

In Figures 8 and 9 is illustrated a further method in which blanks 22 are formed similar in physical and chemical characteristics to the blank 16 except that they are formed with washer-receiving recesses or depressions 23. These depressions are of slightly smaller diameter than the washers 19 so that the latter may be readily pushed into the depressions and when so inserted are gripped peripherally by the sides of the depressions. After the washers have been inserted the blanks are transferred to the usual heel making dies.

The method of forming the blanks 22 is similar to that employed in making the blanks 16 except that the grid 26 is placed below the mix instead of above so that the fin will be on the top of the blank and not on the bottom. This is of importance since the washer-receiving depressions compels the insertion of the blanks into the heel making mould in the same position as they occupied in the blank forming operation and a fin at the bottom of the blanks would interfere with their insertion into the final mould.

Beneath the grid 26 is a plate 24 having a series of cylindrical projections 25 thereon adapted to produce the desired recesses 23 in the blanks. It will be obvious that if the plate 24 were secured to the underside of the die 11 or the latter was formed with integral cylindrical projections the position of the grid relative to the mix might be reversed without producing a fin on the wrong side of the blank.

It has been found that after the heels have been taken from the final moulds and the fin trimmed off that the rubber adjacent the fin tends to retract and leave an undesirable groove around the top of the heel. This may be avoided by laying upon the blank 16, after insertion in the final mould 30, a thin layer of rubber material 31 of greater plasticity and lesser elasticity than that of the blank. This layer gives a clean edge to the upper part of the heel and since it contacts with the leather of the shoe its lower wearing qualities are not deleterious. This layer may conveniently be about ⅛ of the thickness of the heel.

The temperatures employed in the various operations are those commonly used in vulcanizing operations. For most mixtures a temperature of 180° C. is satisfactory.

The pressures used are high. Thus it has been found that 1800 lbs. per sq. in. gives very satisfactory results.

The waste vulcanized rubber scrap used is selected and proportioned according to the degree of vulcanization required in the final article. Thus for example, rubber from automobile tire treads may to advantage have mixed therewith some less highly vulcanized scrap such, for example, as automobile inner tubes.

It has been found that to obtain the most beneficial results the non-rubber material should be added to the scrap before the grinding operation so that the former are ground into the latter. This grinding operation creates considerable heat so that if no special pre-heating treatment is applied the mix should preferably be used immediately after grinding to obtain the advantage of such heat. It is desirable, however, even when that is done to supplement the heat of grinding by treatment in a heating drum.

While the invention has been described more particularly in connection with the manufacture of articles wholly from ground waste vulcanized rubber scrap it is also applicable to other mixes consisting in whole or in part of unvulcanized raw rubber or of reclaimed rubber. The invention is not restricted to the use of finely ground rubber and in some cases the rubber may be worked into sheets upon mixing rolls and then cut into squares of the size of the mould 12 and inserted therein. The grid 14 is then laid on top and the material of the sheet squeezed into the apertures in the grid to form blanks for the final heel making operation. In some cases the position of the grid and sheet may be reversed. In this way there is little or no scrap to be re-worked on the rolls as is always the case where the blanks are cut or punched from such sheets. In general continued re-working of even unvulcanized rubber is not desirable and by the method just described such re-working is almost wholly avoided.

I am aware that various details of operation and construction of apparatus employed may be varied through a wide range without departing from the principles of this invention, and therefore do not purpose limiting the patent granted otherwise than as necessitated by the prior art.

I claim as my invention:

The process of forming rubber heels from ground waste vulcanized rubber including forming partially cured blanks therefrom of smaller area but greater thickness than the finished article, inserting these blanks in a mould placing a layer of rubber material thereon of greater plasticity and lesser elasticity than that of the blank and subjecting the whole to heat and pressure to produce the finished article.

In testimony whereof I have hereunto subscribed my name.

RICHARD F. KINSLEY.